Oct. 7, 1930. L. G. GRACE 1,777,792
INTERNAL COMBUSTION ENGINE
Filed Dec. 27, 1927    5 Sheets-Sheet 4

Inventor
Laurence Gordon Grace

Oct. 7, 1930.  L. G. GRACE  1,777,792
INTERNAL COMBUSTION ENGINE
Filed Dec. 27, 1927   5 Sheets-Sheet 5
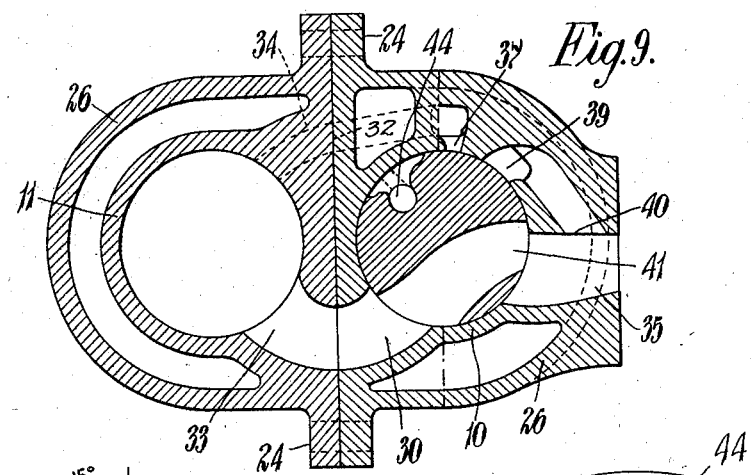
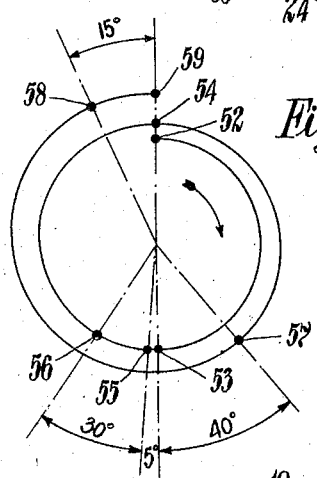
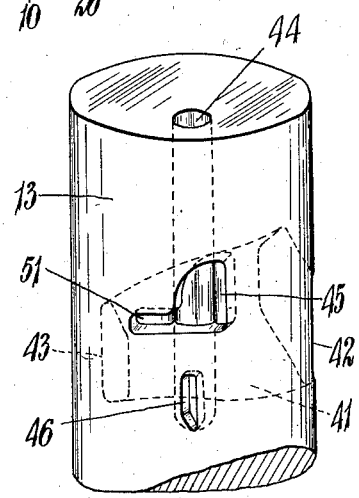
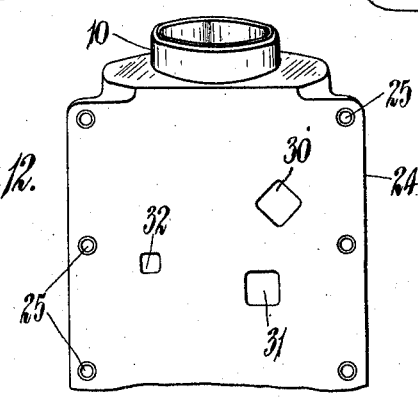
Inventor
Laurence Gordon Grace
By
Attorney Patented Oct. 7, 1930

1,777,792

UNITED STATES PATENT OFFICE

LAURENCE GORDON GRACE, OF WELLINGTON, NEW ZEALAND, ASSIGNOR TO DUPLEX PISTON VALVE (N. Z.) LIMITED, OF WELLINGTON, NEW ZEALAND, A COMPANY OF NEW ZEALAND

INTERNAL-COMBUSTION ENGINE

Application filed December 27, 1927, Serial No. 242,873, and in Great Britain January 22, 1927.

This invention concerns improvements in or relating to internal-combustion engines and has for its main object to provide an arrangement whereby the cylinder of an engine may be both scavenged and supercharged with mixture by means of a single valve or control device which preferably also acts as a valve for admitting mixture to and for allowing exhaust gases to escape from the said cylinder.

Preferably the control device comprises a piston-valve adapted to be both reciprocated and oscillated and arranged laterally of the engine-cylinder so as to act in the manner described in my prior Patent No. 1,608,020 granted November 23, 1926.

In the accompanying drawings:

Fig. 9 is a cross-sectional view of both the main cylinder and valve-cylinder taken partly horizontally and partly on the line II—II of Fig. 1, the valve being, however, in a slightly different position;

Fig. 10 is a timing-diagram;

Fig. 11 is a perspective view of the valve, and

Fig. 12 is an elevation of a portion of the valve-cylinder.

Figure 1:
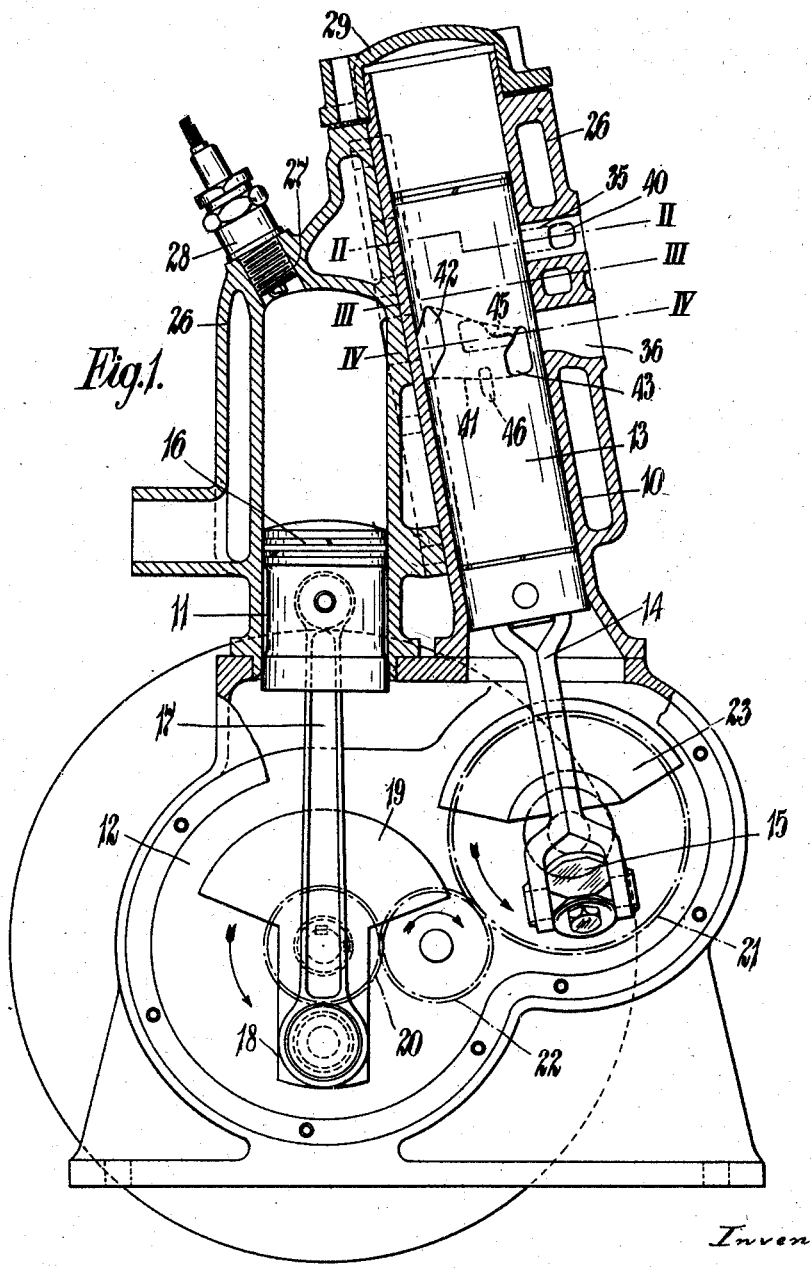
Fig. 1 is a longitudinal section of a single-cylinder engine embodying the invention.

The arrangement shown is substantially the same in its general construction as that described in my aforesaid prior Patent No. 1,608,020; i. e. the valve cylinder 10 is arranged adjacent to the main or power cylinder 11 so as to receive lubrication from the crankcase 12 (on which both cylinders are supported as indicated in Fig. 1), and the valve 13 in the cylinder 10 is driven by a connecting-rod 14 from an inclined crank 15 so as to be rotated in one direction through 90° during one-half revolution and to be rotated 90° in the opposite direction during the other half-revolution while being continuously reciprocated.

The engine piston 16 is coupled in the usual manner by a connecting-rod 17 to a crank 18, balanced by a counterweight 19, and the crank-shaft drives half-time gearing 20, 21 for rotation of the crank 15, an idler wheel 22 being inserted in the drive to connect the wheels 20, 21 and cause the crank 15 to rotate in the same direction as the crank 18. The crank 15 carries a balance-weight 23.

The two cylinders 10 and 11 have flat adjoining faces as shown in Fig. 9 and are flanged as at 24 to receive securing-bolts passing through holes 25 (Fig. 12) therein. Both cylinders are also formed with integral water-jackets 26, through which the various ports hereinafter described extend as cast passages. The engine cylinder jacket also has a cast passage 27 which is threaded to receive a sparking-plug 28.

The valve-cylinder 10 is closed by a cap 29 bolted thereon and on the cylinder 11.

The flat face of the valve-cylinder 10 adjoining the engine cylinder 11 has extending through it three ports 30, 31, 32 registering with corresponding ports in the face of the cylinder 11, of which only two, designated 33 and 34, are shown (Fig. 9). In addition the valve cylinder has two ports 35 and 36 which are adapted to be brought into communication with the ports 30 and 31 respectively by a passage in the valve to be described hereinafter and which are connected to the carbureter and exhaust-pipe (not shown) respectively.

Figure 2:
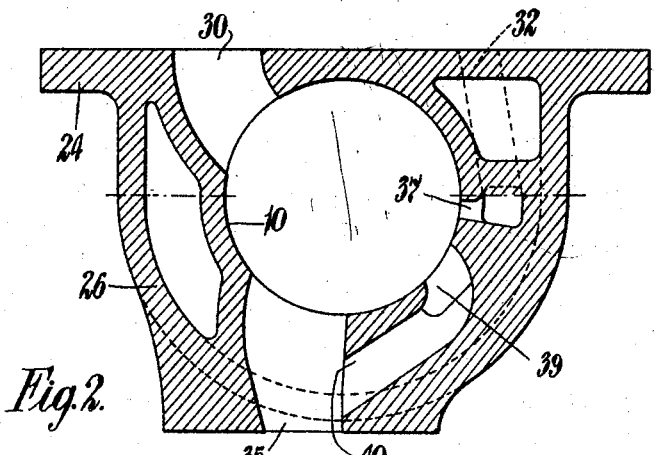
Figs. 2, 3 and 4 are sections of the valve-cylinder taken on the lines II—II, III—III and IV—IV respectively in Fig. 1.
Figure 3:
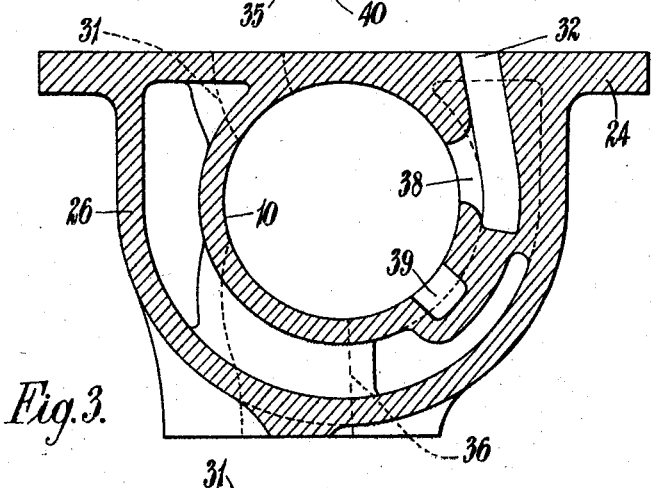
Figure 4:
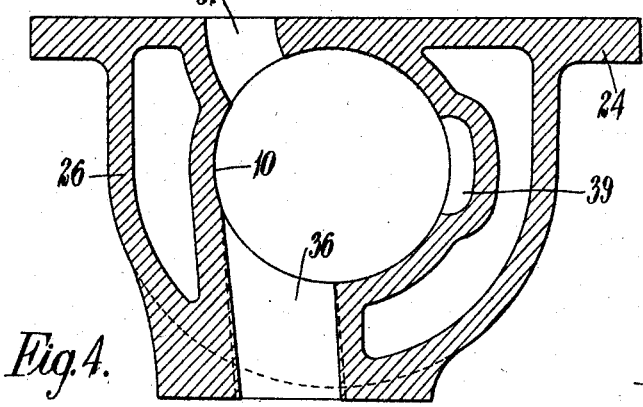
Figure 5:
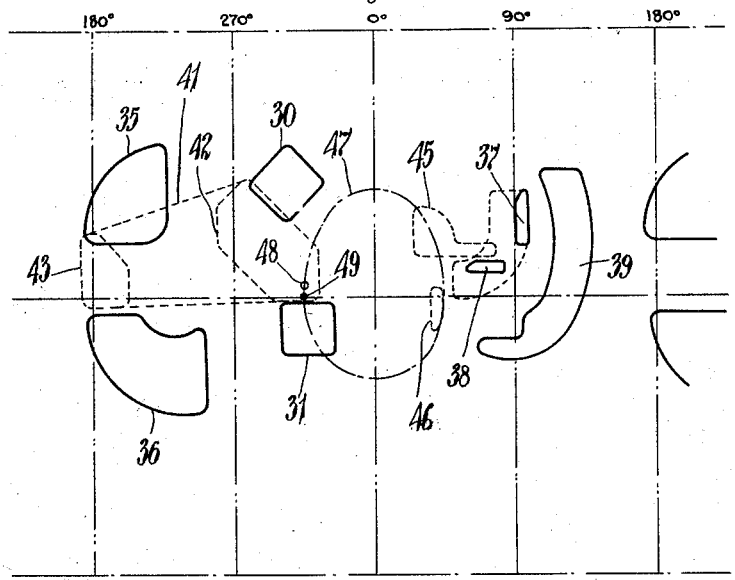
Figs. 5, 6, 7 and 8 are views showing in development the surfaces of the valve and valve-cylinder in various positions described in detail hereinafter.
Figure 6:
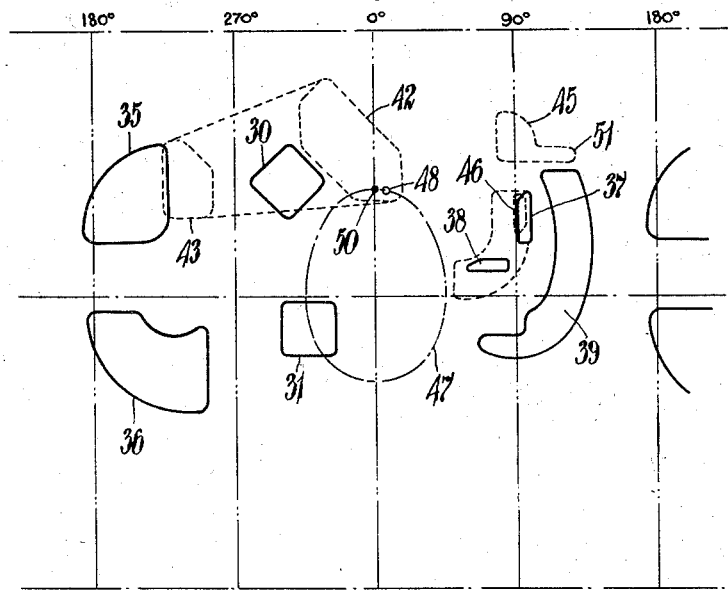

The port 32 is prolonged in the manner indicated in Figs. 2, 3 and 9 to open into the valve-cylinder 10 as shown in Figs. 2, 3 and 5 to 8 at two places so as to furnish two substantially rectangular ports 37 and 38. Adjacent these ports is a further curved port 39 (Figs. 2 to 8) which extends to connect up to the inlet 35 (Figs 2) at 40.

The valve 13 has a transverse passage 41 adapted to co-operate at its two ends forming ports 42 and 43 with the ports 30, 31 and 35, 36 respectively. Moreover, the valve has a longitudinal passage 44 communicating with two lateral passages (Figs 9 and 11)

ending in ports 45, 46 (Figs. 5 to 9) co-operating with the ports 37, 38 and 39 in the valve cylinder.

The valve 13, due to its inclined-crank drive, receives, as above mentioned, a continuous reciprocatory and oscillatory motion and any point on the piston-valve periphery therefore executes a movement in a substantially oval or elliptical path. This path is indicated in the developed views in Figs. 5 to 8 at 47 for a point 48 on the valve surface.

The ports in the valve-cylinder are in these views shown in full lines and those in the valve in dotted lines, the views showing the relative positions of these ports at equal intervals throughout the cycle of operations. The point 48 being that considered will be followed in its movement along the curve 47 (in a clockwise direction) starting from the position 49 (Fig. 5) it occupies at the commencement of the cycle. At this time the ports 42, 43 are out of register with the ports 30, 31, 35, 36, but as the point moves from this position into that indicated in Fig. 5 the ports 42, 43 commence to overlap the ports 30 and 35 respectively as shown, thus placing the cylinder 11 in communication with the carbureter. The engine piston 16 is now moving downwards and mixture is thus sucked into the cylinder 10 through the ports 35, 43, passage 41, and ports 42, 30.

Such admission of mixture continues until the valve has reached the position where the point 48 is at its highest position 50 (Fig. 6) whereat the port 42 is moved out of register with the port 30 and the normal charging of the cylinder 11 thus terminated. During the normal charging period, the ports 45 and 46 in the valve are out of action, but when the valve has travelled into the position indicated in Fig. 6 the port 46 has been brought into register with the port 37, and there is a momentary connection of the passage 44 in the valve through the port 37 with the cylinder 11 during which time mixture that has previously been admitted above the valve in the manner to be described and has been compressed by the upward movement of the said valve is enabled to flow through the passage 44 and thence through the ports 46, 37 and 32 to the engine cylinder 11, thus effecting a supercharging operation after the normal charging has finished.

Figure 7:
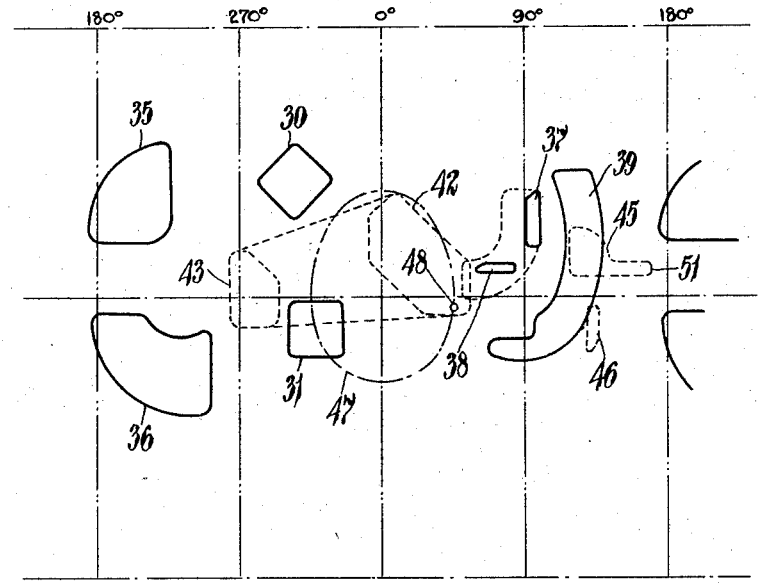
Figure 8:
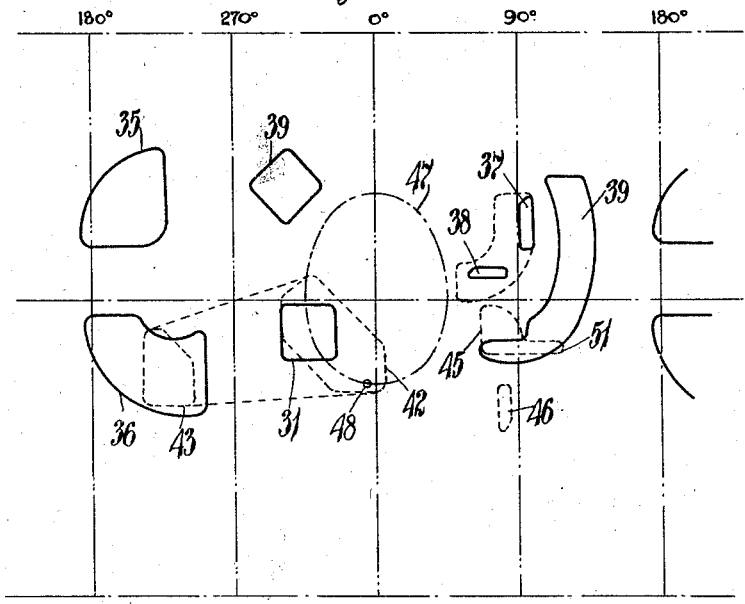

During the compression stroke of the engine piston 16, the ports 42, 43 are, of course out of action but shortly after this stroke has commenced, the port 45 in the valve has come into co-incidence with the casing port 39, so that due to the reduction of pressure above the valve by reason of the downward movement of the latter, mixture enters through the cylinder ports 35 and 40 and passes by way of the ports 39 and 45 to the passage 44 and thence to the space above the valve. This admission of mixture commences almost immediately after the supercharging has been effected, i. e. when the valve has moved slightly beyond the position shown in Fig. 6, and continues until the exhaust stroke has been partially effected. Fig. 7 shows the relative positions of the various ports when the explosion stroke has just commenced, while Fig. 8 shows the positions when the exhaust stroke has commenced. It will be noted that the exhaust ports 31, 36 have been brought into communication by the passage 41 before the explosion stroke of the piston 16 has ended and remain in communication until the valve has finished its cycle of operations, i. e. until the piston 16 has ended its exhaust stroke.

The timing relatively to the movement of the main crank is indicated in Fig. 10 and will be referred to more in detail hereinafter.

The port 46 also for a short time co-operates with the port 39 during the admission of mixture through the latter, so that this port 46 also serves to admit mixture to the space above the valve in the same manner as the port 45.

When the valve has reached a position immediately before that indicated in Fig. 8, it has, of course, commenced to move upwardly and the mixture above the valve is thus compressed, the port 45 being moved out of register with the port 39 immediately after the position shown in Fig. 8 has been passed through. During this time, exhaust of the cylinder 11 is taking place as above mentioned; the port 31 that opens into the combustion space in cylinder 11 then registering with port 42 and, hence, communicating via passage 41 and port 43 with the port 36 of the valve cylinder 10, through which port 36 the spent gases escape. Immediately before the completion of the cycle, the horizontal extension 51 of the valve port 45 (Fig. 11) comes into register with the cylinder port 38, so that part of the compressed mixture above the valve is allowed to pass through the passage 44 and ports 51, 38, 32 and 34 to the cylinder 11 to scavenge the latter. At the commencement of the following inlet stroke, the port 45 is, of course, in the position shown in Fig. 5, wherein it has just passed the port 38.

The remaining mixture is compressed by the valve in its continued upward movement during the commencement of the next cycle and it is this remaining quantity of mixture that is used in said next cycle for the supercharging operation above described. The exhaust ports 31, 36 are, of course, still in communication by the passage 41 during the scavenging operation but are cut off at the same time as the scavenging operation terminates, the valve then starting its next cycle.

It will now be clear from the cycle of operations described that Fig. 1 shows the engine in the position where the piston 16 is about to commence its exhaust stroke, while Fig. 9 shows it in the position where the piston 16 has travelled through rather more than half of its admission stroke.

As previously mentioned, Fig. 10 shows the timing relatively to the movement of the main crank 18. During the first half-revolution thereof from point 52 to point 53 on the diagram, admission takes place, and from point 53 to point 54, i. e. during the next half-revolution, compression occurs, in the usual manner. At the point 55, however, when the crank has moved through 5° on its second half-revolution, supercharging is started, this operation lasting during a 30° travel of the crank, until the point 56 is reached.

The explosion stroke starts at the end of the second half-revolution (indicated at point 54) and continues for 140°, at which time, represented by point 57, exhaust commences. In other words, the exhaust ports are opened before the end of the working stroke is reached. These ports remain in action until the end of the cycle, and in addition the supercharging ports come into action to scavenge the engine cylinder during the last 15° of the crank movement, i. e. during the movement between the points 58 and 59 on the diagram. At the end of the second revolution of the crank (point 59) the scavenging and exhaust ports are all closed.

While the construction described and illustrated is preferred, it will be apparent that without involving very substantial change, such construction may be reversed to the extent that two transverse passages may be provided in the valve for cooperation with a single port in the engine cylinder, in place of the passage 41 and the ports 30, 31. Furthermore, air might be utilized in place of the fuel mixture, if desired. Separate illustration of these features is considered unnecessary.

What I claim is:—

1. In combination with an internal combustion engine, a valve for compressing a fluid medium for both supercharging and scavenging of the combustion space of the engine.

2. In combination with an internal combustion engine, a cylinder, and a piston valve therein for effecting both supercharging and scavenging of the combustion space of the engine.

3. In combination with an internal combustion engine, a cylinder, a piston valve movable therein, and means for simultaneously reciprocating and oscillating said valve to effect supercharging and scavenging of the combustion space of the engine.

4. In combination with an internal combustion engine, a cylinder, and a valve movable therein, an inclined crank for simultaneously reciprocating and oscillating said valve to effect supercharging and scavenging of the combustion space of the engine, and means for driving said inclined crank from the power shaft of the engine.

5. In combination with an internal combustion engine, a single movable valve for controlling the inlet to and exhaust from the engine and for compressing a fluid medium for supercharging the combustion space of the engine.

6. In combination with an internal combustion engine, a single movable valve for controlling the inlet to and exhaust from the engine and for compressing a fluid medium for scavenging the combustion space of the engine.

7. In combination with an internal combustion engine, a piston valve for controlling the admission and exhaust phases of the operation of the engine and for effecting supercharging of the combustion space thereof.

8. In combination with an internal combustion engine, a piston valve for controlling the admission and exhaust phases of the operation of the engine and for effecting scavenging of the combustion space thereof.

9. In combination with an internal combustion engine, a cylinder, a piston valve movable therein, and means for simultaneously imparting to said valve continuous reciprocatory and oscillatory motion, said cylinder and valve being formed with passages and ports such that the valve controls the admission and exhaust operations of the engine and effects supercharging of the combustion space thereof.

10. An internal combustion engine of the reciprocatory type having a power cylinder and a valve cylinder, a piston valve movable in the valve cylinder, an inclined crank for imparting to said valve continuous reciprocatory and oscillatory motion, and means for driving said crank from the crank gear of the power cylinder, said cylinders and valve being provided with passages and ports such that the valve controls the admission and exhaust operations of the power cylinder and effects supercharging of the combustion space thereof.

11. An internal combustion engine of the reciprocatory type having a power cylinder and a valve cylinder, and a piston valve movable in the latter cylinder; said valve cylinder being in port communication with the carbureter, exhaust pipe and power cylinder of the engine; and said piston valve having a passage communicating with said ports and also having a longitudinal passage by which a supercharging medium admitted to the space above the valve may be admitted to the combustion space of the power cylinder.

12. An internal combustion engine of the reciprocating type having a power cylinder and a valve cylinder, a piston valve movable in the latter cylinder; said valve cylinder being in port communication with the carbureter, exhaust pipe and power cylinder of the engine; and said piston valve having a passage communicating with said ports and also having a longitudinal passage by which a supercharging medium admitted to the space above the valve may be admitted to the combustion space of the power cylinder; and means for imparting to said piston valve continuously both reciprocatory and oscillatory movements.

In testimony whereof I hereunto affix my signature this ninth day of December, 1927.

LAURENCE GORDON GRACE.